(12) United States Patent
Cholley

(10) Patent No.: US 10,260,728 B2
(45) Date of Patent: Apr. 16, 2019

(54) ROTARY LIGHT MODULE

(71) Applicant: VALEO VISION, Bobigny (FR)

(72) Inventor: Benoit Cholley, Angers (FR)

(73) Assignee: VALEO VISION, Bobigny (FR)

( * ) Notice: Subject to any disclaimer, the term of this patent is extended or adjusted under 35 U.S.C. 154(b) by 160 days.

(21) Appl. No.: 15/581,469

(22) Filed: Apr. 28, 2017

(65) Prior Publication Data

US 2017/0314755 A1 Nov. 2, 2017

(30) Foreign Application Priority Data

Apr. 28, 2016 (FR) .................................... 16 53832

(51) Int. Cl.
| | |
|---|---|
| *B60Q 1/076* | (2006.01) |
| *B60R 16/02* | (2006.01) |
| *F21S 41/19* | (2018.01) |
| *F21S 41/32* | (2018.01) |
| *F21S 41/55* | (2018.01) |
| *F21S 43/14* | (2018.01) |
| *F21S 43/19* | (2018.01) |
| *F21S 43/31* | (2018.01) |
| *F21S 43/50* | (2018.01) |

(Continued)

(52) U.S. Cl.
CPC .............. *F21V 29/70* (2015.01); *B60Q 1/076* (2013.01); *B60R 16/0215* (2013.01); *F21S 41/141* (2018.01); *F21S 41/192* (2018.01); *F21S 41/32* (2018.01); *F21S 41/55* (2018.01); *F21S 41/675* (2018.01); *F21S 43/14* (2018.01); *F21S 43/195* (2018.01); *F21S 43/31* (2018.01); *F21S 43/50* (2018.01); *F21S 45/40* (2018.01); *F21V 29/89* (2015.01)

(58) Field of Classification Search
CPC ...... B60Q 1/076; F21S 41/141; F21S 41/192; F21S 41/32; F21S 41/675; F21S 43/14; F21S 43/195; F21S 43/31
USPC ........................................................ 362/514
See application file for complete search history.

(56) References Cited

U.S. PATENT DOCUMENTS

| | | | |
|---|---|---|---|
| 1,369,953 A | 3/1921 | Beach | |
| 6,616,302 B2 * | 9/2003 | Sugimoto .............. | B60Q 1/076 362/272 |

(Continued)

OTHER PUBLICATIONS

French Preliminary Search Report dated Oct. 14, 2016 in French Application 16 53832 filed on Apr. 28, 2016 (with English Translation of Categories of Cited Documents).

*Primary Examiner* — Peggy A Neils
(74) *Attorney, Agent, or Firm* — Oblon, McClelland, Maier & Neustadt, L.L.P.

(57) ABSTRACT

A light module for a motor vehicle comprises at least one light source capable of emitting light rays, a support bearing the source, an electrical power supply cable of the source, an optical deflection element arranged so as to deflect the light rays emitted by this source to form a projected light beam at the output of the light module, and a guiding device for guiding the optical deflection element in rotation about an axis of rotation, in order to transversely shift the projected light beam. According to the invention, the support comprises a first part, bearing the light source, and the second part, between which there is inserted at least a part of the guiding device, and the cable passes through the rotation guiding device to be connected to said light source.

20 Claims, 2 Drawing Sheets

(51) Int. Cl.
  *F21S 45/40*      (2018.01)
  *F21V 29/70*      (2015.01)
  *F21V 29/89*      (2015.01)
  *F21S 41/141*     (2018.01)
  *F21S 41/675*     (2018.01)

(56) References Cited

U.S. PATENT DOCUMENTS

| | | | |
|---|---|---|---|
| 7,810,972 B2 * | 10/2010 | Popelek | F21S 48/1757 |
| | | | 362/512 |
| 7,972,049 B2 * | 7/2011 | Sugie | F21S 41/196 |
| | | | 362/545 |
| 9,534,756 B2 * | 1/2017 | Takahira | F21V 14/00 |
| 2011/0019438 A1 | 1/2011 | Juang et al. | |

* cited by examiner

ROTARY LIGHT MODULE

The invention relates to the field of lighting and/or signaling, notably for a motor vehicle. More particularly, the invention deals with a light module for a motor vehicle, and a lighting and/or signaling device comprising such a light module.

Lighting and/or signaling devices can comprise one or more light modules mounted to rotate about an axis, notably to address issues of adaptive lighting. In particular, the document EP 295 74 64 describes a lighting and/or signaling device for a motor vehicle which comprises a housing and an assembly of at least two light modules, in which at least a part of each light module is mounted to be rotationally mobile about an axis under the effect of an actuator to transversely shift the corresponding light beam at the output of the light module. An associated control device is capable of generating, distinctly for each light module, specific lighting control instructions according to traffic conditions.

It will be understood that fitting rotating elements in a lighting device requires the electrical power supply cables necessary to the powering of the light sources associated with the lighting device to be taken into account. It is best, in the case where the source is arranged at the center of the device and cables have to pass through this device to power the light source, for the rotation of the rotating elements not to be hampered by the presence of cables and for this rotation not to generate any degradation of these cables.

The aim of the invention is to propose a support bearing a light source originating the projected light beam at the output of the light module, configured to allow the light source to be electrically powered without interfering in the rotational movement of a rotary light module. The invention is an improvement on the lighting and/or signaling devices for motor vehicles known from the prior art, notably with respect to the rotational guiding of a light module for a transverse shifting of the light beam that it generates and with regard to the management of the electrical power supply cables in such rotation guiding.

In this dual context, the subject of the invention is a light module, notably for a motor vehicle, comprising at least one light source capable of emitting light rays, at least one support element bearing said light source, at least one electrical power supply cable of said at least one light source, at least one optical deflection element arranged so as to deflect the light rays emitted by the at least one light source to form a projected light beam at the output of the light module, a guiding device for guiding the optical deflection element in rotation about an axis of rotation, in order to transversely shift the projected light beam.

According to the invention, the support comprises a first part and a second part between which there is inserted at least a part of the rotation guiding device of the optical deflection element. The first part of the support bears the light source, whether directly or indirectly via, for example, a printed circuit board fixed onto a face of this first part of the support. And said at least one cable passes through the rotation guiding device to be connected to said light source.

Transverse shifting of the light beam should be understood to mean that the general orientation of the beam projected at the output of the module, that is to say toward the road scene in front of the vehicle, varies in a plane at right angles to the axis of rotation of the optical deflection element.

There is thus an assurance, in the vicinity of the light source, that the optical deflection element can rotate with precision about the first axis of rotation, notably by virtue of the guiding device, without this rotation being hampered by the presence of cables, since the latter extends substantially along the first axis of rotation, at least through the rotation guiding device, because of the specific configuration of the support.

According to a feature of the invention, the at least one cable, or bundle of cables if appropriate, can be broken down into a plurality of successive portions, including:
a first portion for connection to a control module, arranged at least partly in the second part of the support, which can notably be arranged so as to come to overlap the first part of the support and the rotation guiding device,
a second intermediate portion, passing through the rotation guiding device, and
a third portion for connection to the light source.

In particular, provision can be made for the bundle of cables to pass through the rotation guiding device substantially at the center thereof, or, in other words, centered on the first axis of rotation.

The optical deflection element is rotationally mobile under the effect of an actuator, which can notably comprise an output shaft extending along the first axis of rotation and bearing the optical deflection element.

Advantageously, the actuator and the rotation guiding device are arranged on either side of the optical deflection element along the first axis of rotation. It will be understood that an overhanging arrangement, in which the part of the optical deflection element opposite the actuator would tend to be offset from the axis of rotation, is thus avoided.

According to a first series of features, taken alone or in combination, it will be possible to provide for:
the first part of the support to have a first face bearing the light source, an opposite second face turned toward the second part of the support and a peripheral face axially linking the first and the second face;
the third portion of the bundle of cables to be arranged along the second face and against the peripheral face, such that the bundle of cables is at least partially offset in this third portion relative to the first axis of rotation of the optical deflection element;
an indentation to be arranged at least on the second face to house the third portion of the bundle of cables;
a flat to be formed axially by machining the peripheral face, said bundle of cables being pressed against the face of said flat.

In the case where the light source is borne indirectly by the first part of the support, a support plate of the light source, and, if necessary, a printed circuit board associated with a light-emitting diode forming the light source, has a first face bearing the light source and a second face arranged against the first face of the first part of the support, said bundle of cables being connected to an opposite second face of the support plate.

According to a feature of the invention, the module can comprise a guiding sleeve for the bundle of cables fixed onto the first part of the support. This sleeve will notably be able to be fixed onto the first part of the support at least at the indentation.

Furthermore, the invention has at least one of the following features, considered in isolation or in combination:
the first part of the support and/or the second part of the support is produced in a heat-conducting metal material, notably aluminum;
the rotation guiding device consists of a stator secured to the second part of the support and of a rotor secured to the optical deflection elements and configured to rotate about the stator;

the rotor and/or the stator can be produced in a plastic material;

the stator has a cylindrical form with circular section;

the rotor has an annular portion dimensioned to surround said stator;

the rotor comprises at least two lugs for fixing to the optical deflection element arranged protruding from said annular portion; preferably, the two fixing lugs are diametrically opposite;

each fixing lug can comprise a leg axially extending the annular guiding portion and a finger extending, substantially at right angles, the free end of said leg;

the fixing lug is made secure to the optical deflection element, notably by snap-riveting, screwing or welding;

the rotation guiding device can comprise a ball bearing, arranged between the rotor and the stator;

the stator is gripped between the two parts of the support;

the stator can comprise common means for fixing to the two parts of the support and to the stator, notably tightening screws;

the first part of the support has an outer face turned away from the stator and from the second part of the support, said light source being borne on said outer face;

at least the stator is pierced axially to allow the passage of power supply cables of the light source; it will also be possible to provide one and/or the other of the parts of the support to be also pierced;

the second part of the support has a cavity for receiving the stator and the first part of the support; the stator and the annular portion of the rotor can be retracted into said cavity.

The optical deflection element can consist of a reflector of substantially elliptical form, the light source being substantially in the vicinity of a first focus of said reflector.

According to a feature of the invention, the optical deflection element can also be mounted to be rotationally mobile about a second axis of rotation substantially at right angles to the first axis of rotation to shift, in a direction other than the transverse direction described previously, for example in a vertical direction, the corresponding light beam at the output of the light module. Preferably, the second axis of rotation is borne by the second part of the support associated with the light module.

According to another series of features, taken alone or in combination with the preceding features, specific to the light source, it will be possible to provide for:

the light source to comprise at least one semiconductor emissive element;

the light source to be a light-emitting diode;

the module to comprise an electrical connection substrate capable of electrically powering the light source;

the connection substrate to be a printed circuit board, a flexible printed circuit board or an interconnection device with variable geometry;

the light source to be arranged on the electrical connection substrate.

The invention relates also to a lighting and/or signaling device comprising at least one light module as has just been described previously. The device can notably comprise a casing defining, with an enclosing outer lens, a housing for receiving at least one light module. The light beam projected at the output of the light module is configured to pass through this enclosing outer lens before being projected onto the road scene in front of the vehicle. Preferably, this lighting and/or signaling device comprises three light modules according to the invention. Particularly in this case, and when there are several light modules arranged in a common light device, the light beams projected by each of the modules are configured to form a global light beam, notably meeting the regulatory motor vehicle lighting and/or signaling standards.

Other features and advantages of the present invention will become more clearly apparent in the light of the description and the drawings, in which.

In the following description, a longitudinal, vertical and transverse orientation will, in a nonlimiting manner, be adopted according to the orientation traditionally used in the automobile industry. Furthermore, the terms bottom and top should be interpreted when the object is in the normal position of use.

Figure 1:
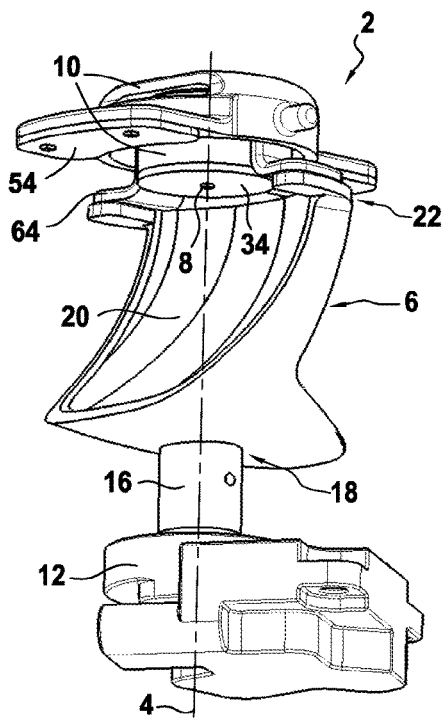
FIG. 1 is a three-quarters perspective view from the front of a light module, according to an embodiment of the invention.
Figure 2:
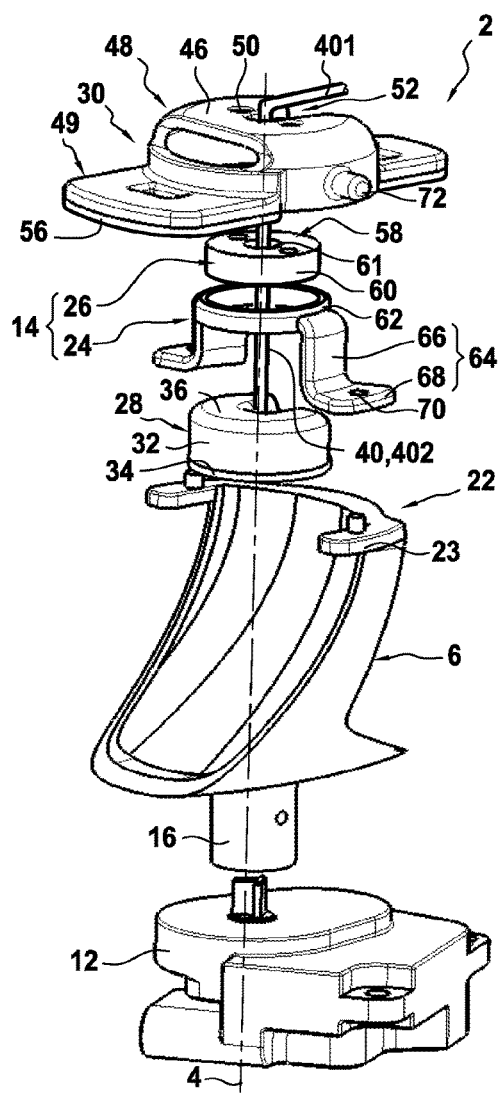
FIG. 2 is a perspective exploded view of the light module represented in FIG. 1.
Figure 3:
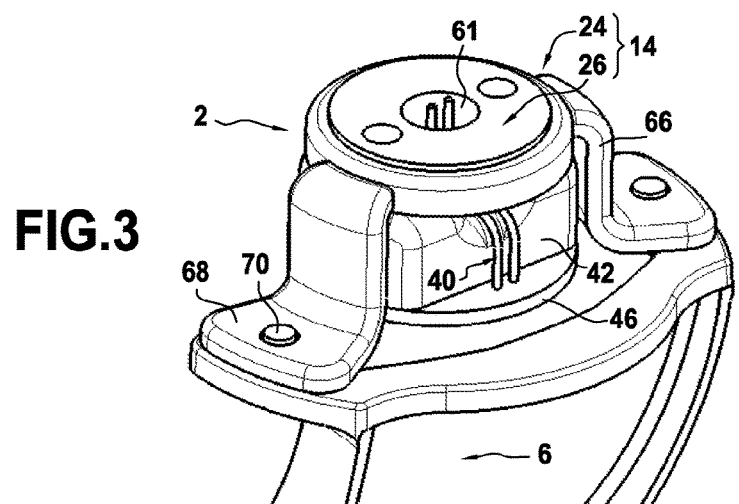
FIG. 3 is a three-quarters perspective view from the rear of the light module represented in FIG. 1, a part coming to overlap the module in FIG. 1 here being not represented to make it easier to read the figure.

FIGS. 1 to 3 represent a light module 2 that is rotationally mobile about an axis of rotation 4.

This light module 2 comprises at least one optical deflection element 6 for rays emitted by a light source 8 borne by a support 10. The optical deflection element or elements 6 are arranged about the axis of rotation 4 and they are driven in rotation by an actuator 12 about the axis of rotation 4 to transversely shift a corresponding light beam at the output of the light module 2.

The optical deflection elements 6 cooperate with the support 10 coming to overlap the light module 2, notably via a rotation guiding device 14 (notably visible in FIG. 2). It will be understood that the support 10 on the one hand bears the light source 8, which emits rays toward the optical deflection elements 6, and on the other hand bears a part of the device 14 for guiding the optical deflection elements 6 in rotation about the axis of rotation 4. The optical deflection elements 6, which will be described in more detail hereinbelow, are arranged against the guiding device 14 and the actuator 12 relative to their arrangement along the axis of rotation 4.

Control means (not represented here) drive the actuator 12. A movement is transmitted by this actuator 12 to an output shaft 16, which transmits to the optical deflection elements 6 the rotation movement commanded about the axis of rotation 4. As represented, the output shaft 16 is made secured to the optical deflection elements 6 at a first end 18, here considered as bottom end relative to the orientation defined previously.

The optical deflection elements 6 here consist of an elliptical or parabolic reflector, with a reflecting face 20 configured to reflect the light rays emitted by the light source 8, which is arranged substantially in the vicinity of a first focus of the optical deflection elements 6. A light beam is thus generated to form a beam that is regulatory from the point of view of the lighting and/or signaling of a motor vehicle.

It will be noted that, without departing from the context of the invention, the optical deflection elements 6 can take different forms provided that they are driven in rotation by an actuator 12 at a first end relative to the axis of rotation 4 and that their arrangement relative to the light source makes it possible to form in a regulatory beam.

In the vicinity of a second end 22 of the optical deflection elements 6, here the end called top end according to the orientation described previously, that is to say the end opposite the first end 18 where the actuator 12 extends, there are arranged the rotation guiding device 14 via which the optical deflection elements 6 cooperate with the support 10.

Notably in order to allow the fixing of a part of this rotation guiding device 14 to the optical deflection elements 6, at the second end 22 an edge 23 is provided which forms, at the periphery of the reflecting face 20, a bearing surface for this part of the rotation guiding device.

It will be understood that the arrangement of the rotation guiding device 14 and of the driving means that the actuator 12 and the output shaft 16 form, on either side of the optical deflection elements 6, allows for an optical guiding of the optical deflection elements in rotation about the axis of rotation.

The rotation guiding device 14 and the output shaft 16 make the optical deflection elements 6 capable of performing a rotation of up to 360 degrees about the first axis of rotation 4, substantially vertical, without load on the actuator 12, and with great accuracy in the relative positioning of the optical deflection elements 6 and of the light source 8, advantageously centered on the axis of rotation 4.

There now follows a more detailed description of the support 10 and the rotation guiding device 14, as have just been presented, notably with reference to FIG. 2 which represents the support 10 in an exploded view.

The support 10 is formed from two parts, between which are arranged the rotation guiding device 14, which comprise a rotor 24 and a stator 26, one secured to the optical deflection elements 6 and the other secured to the support 10.

The support 10 comprises a first part 28 and a second part 30 which can form heat sinks produced in a heat-conducting metal material, notably in aluminum. These two parts of the support 10 are capable of bearing the rotation guiding device 14 and/or the light source or sources.

The first part 28 of the support 10 has a substantially cylindrical form with a defined parameter and a non-zero thickness, its dimensions being defined to allow a cooperation and a complementarity of form with a part of the guiding device 14 and the second part 30 of the support 10, as described hereinbelow.

The first part 28 of the support 10, as notably represented in FIG. 2, has two opposite end faces and a peripheral face 32 axially linking these two end faces. A first end face, called outer, bears the light source 8 centered on the axis of rotation 4, this outer first face being directed toward the optical deflection elements 6. In this particular illustrated case, the light source 8 is arranged on the first face of a first support plate 34, which is added onto the outer end face of the first part 28 of the support 10. A second end face 36, called inner, of the first part 28 of the support 10 is turned toward the second part 30 of the support 10 (visible in FIG. 2). This inner second end face 36 has an indentation 38, dimensioned to be able to retract a bundle 40 of power supply cables of the light source as will be described hereinbelow, without the latter preventing the stator 26 from being pressed against the inner end face 36 of the first part 28 of the support 10.

Figure 4:
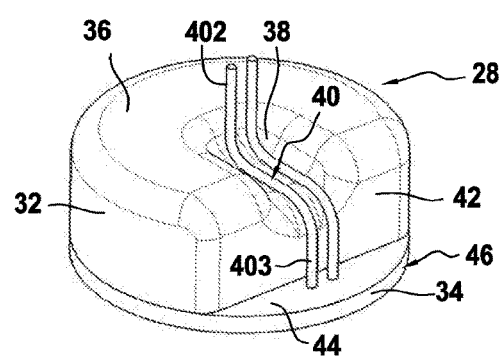
FIG. 4 is a perspective view of a detail of the light module represented in FIG. 3.

Moreover, as can notably be seen in FIGS. 3 and 4, the first part 28 of the support 10 comprises a flat 42 which is machined on the peripheral face 32, the first part of the support being arranged in the light module such that this flat is turned toward the rear of the light module, that is to say that it cannot be seen by an external observer.

The flat 42 is produced axially by cutting over the entire height of the peripheral face 32 from the inner end face 36 to the outer end face, leaving a part of the support plate 34 free, such that a step 44 is formed between the flat 42 and a peripheral edge 46 of the support plate 34. A free position is thus generated to produce the connection between the end of the cables of the bundle and the support plate.

The second part 30 of the support 10 overlaps the light module 2, notably the optical deflection elements 6 and the first part 28 of the support 10. This second part 30 of the support 10 mainly comprises a central portion 48 and one or more peripheral portions 49 which laterally prolong said central portion 48.

The central portion 48 takes the form of a cup comprising a bottom wall and a peripheral wall which prolongs, substantially at right angles, the bottom wall over the entire perimeter thereof. The central portion 48 has a substantially cylindrical form of circular section. As will be described in more detail hereinbelow, the second part 30 is oriented relative to the first part 28 such that the cavity formed inside the cup is turned toward the first part, so as to form a housing for this first part 28 and the rotation guiding part.

In other words, the central portion 48 consists of a cavity for receiving a part of the components of the light module 2, notably a part of the rotation guiding device 14 and the first part 28 of the support 10. The dimensions of this receiving cavity will depend on the dimensions of the components that it has to house.

Moreover, the bottom wall of the central portion 48 is pierced with two through orifices 50 allowing the passage of screwing means, not represented here, for fixing this second part 30 of the support 10 to at least a part of the rotation guiding device 14. It will be possible to provide for the screwing means passing through these through orifices 50 to also allow the fixing of the second part 30 with the first part 28 of the support 10.

The second part 30 of the support 10 has at least one window 52 for accessing the interior of the cavity forming a housing for the rotation guiding device and the first part 28 of the support 10. These windows allow the passage of the bundle of cables as will be described hereinbelow for powering the light sources while making it possible to lighten the second part 30 of the support 10.

The peripheral portion takes the form of a platform which extends in an extension, substantially at right angles, of the peripheral wall of the central portion 48. At least a part of this peripheral portion extends toward the front of the vehicle when the light module 2 is fitted in the vehicle. Said platform 49 is substantially flat and at right angles to the axis of rotation 4 and it bears at least one additional light source 54 on its bottom face, that is to say the face facing the optical deflection elements 6. It will be understood that the length of the platform 49 will have to allow the arrangement of this additional light source such that it is offset transversely relative to the axis of rotation 4. The bottom face of the platform 49 will be able to receive a second printed circuit board 56 on which is arranged the additional light source 54.

There now follows a description more specifically of the rotation guiding device 14 about the axis of rotation 4 of the light module 2. As specified previously, this rotation guiding device 14 consists of a rotor 24 and a stator 26, the latter being arranged between the two parts 28, 30 of the support 10.

The stator 26 is secured to each of the two parts 28, 30 of the support 10 and the rotor 24, arranged to rotate about the stator 26, is secured to the optical deflection elements 6.

The stator 26 has a cylindrical form with circular section, comprising two opposite parallel faces, called top face 58 and bottom face, and a lateral face 60 axially linking the two opposite faces. The stator comprises orifices passing axially through the latter from the top face 58 to the bottom face, such that screwing means described previously and not represented allow the fixing of the stator on the one hand to the second part 30 of the support 10, by pressing the stator to the bottom of the reception cavity of this second part 30 of the support, and on the other hand to the first part 28 of the support 10 which is pressed against the bottom face of the stator.

The stator 26 is thus gripped between the two parts 28, 30 of the support 10.

The stator 26 is pierced at its center with a central orifice 61 to allow the passage of the bundle of cables 40 for connecting the light source 8, this bundle of cables 40 originating from outside the module and passing first through the second part 30 of the support. It will be understood that it is important for the bundle of cables 40 to pass through the stator through the center, in order to not hamper the rotation of the rotor 24 about the fixed stator 26. The bundle of cables is connected to the second face of the first printed circuit board 34, after having passed through the stator at its center, and having run along the first part 28 of the support 10 in the indentation 38, in order, once again, to not hamper the rotation of the rotor.

The rotor 24 comprises an annular portion 62 with an inner diameter greater than the outer diameter of the stator 26, so as to surround the stator 26. At least two fixing lugs 64 extend protruding from the annular portion 62. As represented, the two fixing lugs 64 are diametrically opposite on either side of the annular portion 62. Each fixing lug 64 consists of a leg 66 axially prolonging the annular portion 62 and a finger 68 prolonging, substantially at right angles, a free end of said leg 66. The finger 68 comprises an orifice or a fixing means 70 configured to cooperate with the edge 23 provided at the top end 22 of the optical deflection elements 6. It will be possible to provide a fixing, with no particular preference, by snap riveting, riveting or even by screwing.

There now follows a more detailed description of the arrangement of the rotation guiding device 14 and of the support 10 in the light module 2.

As described previously, the rotor 24 and the stator 26 are arranged at least partly between the first part 28 and the second part 30 of the support 10, notably by being housed at least partly in the reception cavity formed in the central portion 48 of the second part 30 of the support 10, this cavity being dimensioned to receive the stator 26, a part of the rotor 24 and a part of the first part 28 of the support 10, these components being stacked one on top of the other.

The stacking of these different components requires a complementarity of form between these components. The diameter of the stator 26 and the thickness of the annular portion 62 of the rotor 24 are defined relative to the dimensions of the reception cavity. The stator 26 must be able to be accommodated in the cavity and a sufficient free space must be left in the reception cavity between the peripheral wall of the central portion 48 defining this cavity and the lateral face 60 of the stator 26, for the annular portion 62 of the rotor 24 to be able to be inserted between the peripheral wall of the central portion and the lateral face 60 of the stator 26 and for this annular portion to be able to rotate freely about the stator 26 inside the cavity.

In an assembled position of the different components, the rotor 24 is arranged around the stator, in the zone of its annular portion 62, and it extends along the first part 28 of the support 10, in the zone of its two fixing lugs 64 arranged diametrically opposite on either side of this first part 28. The rotor 24 is made secured to the optical deflection elements 6 using the two fixing tabs 64. The rotor 24 extends axially along the peripheral face of the first part 28 of the support 10 to the optical deflection elements 6, such that, when the assembly is fixed the first part 28 of the support 10 is arranged inside the rotor.

It is understood that, when the assembly is mounted, the rotor 24 and the stator 26 consist of two complementary forms allowing the rotation of the rotor 24 and of the associated optical deflection elements 6 about the stator 26 fixed to the support 10. In a variant embodiment not represented, the rotor 24 and the optical deflection elements 6 can form a single piece, one-piece in that the separation of these two parts results in the destruction of one or the other, such that the mounting plays are avoided between the rotor 24 and the optical deflection elements 6 which appear when these two pieces are produced separately.

It has been specified previously that the two parts of the support 10 are advantageously produced so as to form heat sinks and, to this end, it will be possible to provide for them to be produced in a metal material. The rotor 24 and/or the stator 26 can be produced in a plastic material, and, by way of example, polyoxymethylene (POM) or any other material with a low friction coefficient which allows an easy rotation of the rotor about the stator.

According to another variant embodiment, also not represented, the rotation guiding device 14 can comprise a rolling bearing, notably a ball bearing, arranged between the stator 26 and the annular portion 62 of the rotor 24, to facilitate the rotation of the rotor relative to the stator and improve the rotation guiding function.

The different light sources 8, 54 are semiconductor sources, and preferably of light-emitting diode type, and the associated support plates consist of printed circuit boards.

The light source 8 is substantially aligned on the axis of rotation 4. The expression "substantially aligned" should be understood to mean that the distance between the geometrical center of the light source such as a light-emitting diode and the axis of rotation 4 of the light module 2 is no greater than the dimensions of the light-emitting diode. As described previously, the light source 8 is fixed and positioned on the first outer face of the first part 28 of the support 10, via a first printed circuit board 34.

The light sources are fixed in the light module 2 and their emitted light rays are oriented away from the second part 30 of the support 10. These light sources 8, 54 can have, in the light module 2, lighting and/or signaling functions that are distinct according to their locations and the control instructions according to the road conditions. In particular, the light source 8 is arranged to emit light rays toward the reflecting face 20 of the optical deflection elements 6, whereas the additional light source or sources are arranged to emit inside a translucent screen 71 participating in esthetic functions.

There now follows a more detailed description of the arrangement according to the invention of the bundle of cables 40 in the light module.

It is notable that the bundle of cables 40 comprises a first portion 401 for connection to a control module, arranged at least partly in the second part of the support, a second intermediate portion 402, passing through the rotation guiding device 14, and a third portion 403 for connection to the light source 8.

The first connection portion 401 is linked electrically to connectors of a control module (not represented), which can be embedded on the second part 30 of the support, or else which can be arranged outside of the light module, such that the first connection portion extends beyond the second part 30 by passing in particular through an access window 52.

The third connection portion 403 of the bundle of cables is connected to the support plate 34 of the light source, and more particularly at the step 44 in the example illustrated. The third connection portion extends initially substantially at right angles to the support plate 34, along the flat 42, by being pressed against the peripheral face at the rear of the light module 2, and it extends secondly over a part of the inner second end face 36, in the indentation 38. More specifically this part of the inner second end face 36 against which the bundle of cables is pressed extends from the edge of the flat 42 to the center of the first part 28 of the support 10.

The second intermediate portion 402 extends, substantially at right angles, in the extension of the third connection part 403 from the center of the first part 28 of the support.

In this way, the bundle of cables 40 extends substantially parallel to the axis of rotation 4 of the light module, by passing through the guiding device 14 to join up with the second part 30 of the support 10. The bundle of cables 40 passes through the guiding device 14, notably at the center of the annular portion 32 of the rotor 24 and at the center of the stator 26.

This arrangement produced in the first part 28 of the support 10, to have the bundle of cables 40 pass through the guiding device 14, allows the pivoting up to 360 degrees of the optical deflection elements 6 about the axis of rotation 4 without hindrance because the bundle of cables 40 passes through the support 10 via the guiding device 14. Moreover, the presence of an indentation in which the bundle of cables can be retracted makes it possible to not create any protuberance on the inner end face 36 and to be able to bring the stator 24 as close as possible against the first part 28 of the support.

In a variant embodiment not represented, a void can be configured axially through the first part 28 of the support 10, and notably substantially at the center thereof in the extension of the passage of the bundle of cables through the rotation guiding device 14, such that the second portion and the third connection portion extend substantially parallel.

A sleeve can advantageously be arranged over the first part 28 of the support 10, notably over the indentation 38. This sleeve is fixed to the first part 28 at least at the indentation 38, notably by bonding. The sleeve, dimensioned to accommodate the bundle of cables, then serves to protect and guide the bundle of power supply cables 40 arranged against the first part 28 of the support 10.

It will be possible to mount the different parts of the support and the rotor-stator assembly for example by turning over the second part of the support and by arranging, in succession in the reception cavity, the stator that is pressed against the bottom wall of this reception cavity, the rotor, that is arranged around the stator, then the first part 28 of the support that is slid between the fixing lugs 64 to bring it to bear against the stator 26. When this stacking is completed, the two parts of the support and the stator are assembled by tightening screws which pass through each of these components, the rotor being immobilized axially, in the direction of the stacking, that is to say of the screwing, between the bottom wall of the cavity and the inner end face 36 of the first part 28 of the support, it being understood that the diameter of the annular portion 62 of the rotor is such that it can surround the stator, and possibly an associated rolling bearing, and such that this annular portion is in abutment against the inner end face 36 of the first part 28 of the support. It will be understood that the use of material with low friction coefficient makes it possible to not be hampered in the relative rotation of the rotor in relation to the first part of the support despite this abutment. It would be possible, as a variant, to provide for the stator to have a collar extending the end of the stator coming to bear against the inner end face 36 of the first part of the support, and for the rotor to come to bear on this collar rather than on the support, in order to limit the frictions.

In the embodiment illustrated, provision can be made for the second part 30 of the support 10 to be able to have protuberances 72, protruding notably from the central portion 48, that are diametrically opposite and aligned to form an additional axis of rotation 74 (visible in FIG. 5) capable of cooperating with bearings (visible in FIG. 5) which will be described hereinbelow. The protuberances 72 can consist of cylindrical pins.

It will be understood that these protuberances are produced here to form an additional axis of rotation, distinct from the first axis of rotation as described previously, about which the optical deflection elements are configured to rotate, via the actuator 12 and the rotation guiding device 14. The additional axis of rotation 74 allows the light module 2 to pivot and to ensure a vertical movement of the light beam at the output of the light module 2.

Obviously, the rotation guiding function about the first axis of rotation provided by the guiding device 14 and the optimized arrangement in this context of the bundle of cables powering the light source, as has just been described previously, does not require the presence of these protuberances and of this additional axis of rotation. It will be understood that the presence of these protuberances is optional. However, it is interesting to note that the implementation of this additional rotation movement is facilitated by the very accurate rotational guiding about the first axis, since the rotation about this additional axis of rotation would be difficult to implement if an overhang effect were produced in the performance of the rotation about the first axis. And it should be noted that the bundle of cables 40 allows this rotation about the additional axis, inasmuch as it has a third portion that is big enough to exhibit an operating play that can accompany the oscillation of the module. During the rotation about the additional axis of rotation, it should be noted that the first portion of the bundle of cables remains pressed against the first part of the support, advantageously in the housing formed by the indentation, and that the second portion remains taut along the first axis of rotation, through the rotation guiding device 14 and notably at the center of the stator.

The light module according to the invention, as has just been described, participates in the formation of a lighting and/or signaling device, inasmuch as it is arranged in a motor vehicle headlight casing (not represented) enclosed by a projection outer lens, so as to define a housing for the module or modules according to the invention. It will be understood that it will be possible to arrange a plurality of light modules as have just been described to form a lighting and/or signaling device. Note that it is advantageous for the two headlights, left and right, to comprise an equivalent device, with an equivalent number of light modules.

According to the lighting control instructions for the light sources and according to the rotation control instructions for the light module 2, the invention makes it possible to produce different combinations of functions and to widen the lighting zone. A transverse pivoting of at least one light module 2 allows a lighting to the left or the right of the vehicle according to traffic and road conditions.

The device can, to this end, comprise means for detecting a driving situation, means for computing an operating control instruction for the light module or modules 2 according to the information sent by these detection means. These control instructions allow a rotational mobility of at least one module horizontally and/or vertically such that the light beam at the output of the light module 2 that it generates can be oriented so as to cover a large lighting and/or signaling zone while observing bulk constraints of the light device.

Figure 5:
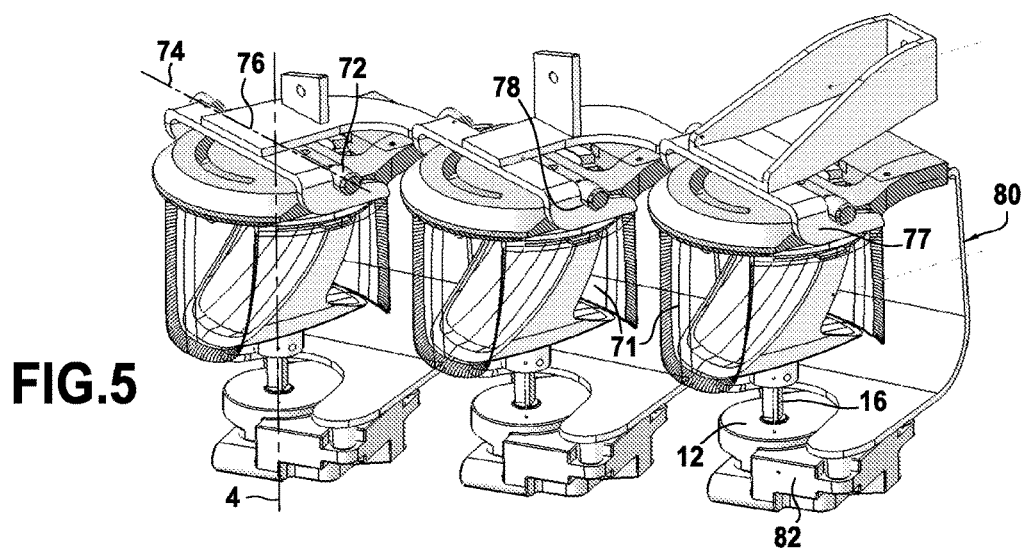
FIG. 5 is a three-quarters perspective view from the front of a lighting and/or signaling device comprising an assembly of three light modules according to the embodiment of the invention represented in FIGS. 1 to 4.

FIG. 5 represents a lighting and/or signaling device comprising three light modules 2 that are rotationally mobile so as to transversely shift the portion that it generates of the overall beam emitted by the lighting and/or signaling module.

Each light module 2 is associated with a plate 76, or a portion of plate 76, which overlaps the second part 30 of the support 10. The plate 76 is fixed to the casing and it is configured to position the second part 30 of the support 10 relative to the headlight.

As represented in FIG. 5, the device comprises a single plate which covers all of the light modules 2 included in the casing, but it will be understood that each light module 2 can be associated with an individual plate, independent of the other plates.

Each of the three light modules 2 is rotationally mobile about an axis of rotation 4 which is specific to it, and in at least one of these light modules, this rotation is facilitated by a rotation guiding device 14 as has just been described. An axis of rotation 4 has been represented in FIG. 5 for one of the light modules 2, and advantageously, the axis of rotation specific to each light module 2 is substantially parallel to the axis of rotation of the neighboring light modules 2.

In the example of application illustrated, the plate 76 participates in the rotating of the light module or modules about the additional axis of rotation 74 which is specific to them. To this end, the plate 76 bears at least two reception lugs 77, made of a piece with or added to and made integral with the plate. For a given light module, two reception lugs 77 are arranged on either side of the module to form steps for receiving elements protruding from the support 10, notably the protuberances 72, as described previously. The two reception lugs 77 each have a hook form defining a groove 78 in which is inserted one of the protuberances 72, of said second part 30 of the support 10. The grooves 78 are arranged coaxially, and the arrangement of the reception lugs 77 and of the protuberances 72 defines the additional axis of rotation 74 for the light module 2, which, in this embodiment, is rotationally mobile according to two axes of rotation 4 and 74, distinct and non-parallel, and advantageously at right angles to one another.

In a given configuration, the first axis of rotation 4 is substantially vertical and allows the horizontal rotation (in the left-right and right-left directions) of the light beam at the output of the corresponding light module 2, within the light device. The additional axis of rotation 74 is substantially horizontal and allows the vertical shifting (in the downward and upward directions) of the light beam at the output of the corresponding light module 2, within the light device.

As can be seen in FIG. 5, the light module 2 according to the invention can comprise a transparent screen 71 arranged on the output path of the light beam from the light module 2. This screen 71 is arranged so as to receive the rays emitted by the additional light source or sources 54. The screen 71 is thus intended to produce a style effect when the additional light sources 54 are on, without hampering the formation of a regulatory beam when the main light source 8 is on. It will be understood that the presence of a screen 71 here has only one additional function and that the light module could, as illustrated in FIGS. 1 to 3, not include such a screen facing the optical deflection elements 6.

The light module 2 further comprises a control device capable of formulating, on the basis of information received from vehicle state sensors, control instructions to be sent to the actuator 12 and to actuation means (not represented) responsible for the rotational movement about the additional axis of rotation 74. The instructions consist in driving the angular position of the light module 2 about the axis of rotation 4 and possibly about the additional axis of rotation 74.

The lighting function can then be directional, by virtue of the actuator 12 and of the actuation means specific to the rotational movement about the additional axis of rotation 74 of the light module 2. The rotational movements about the axis of rotation 4 and about the additional axis of rotation 74 can be simultaneous and calibrated between the two axes or totally independent.

The simultaneous rotation is notably possible because of the driving of the actuator 12 in rotation with the light module 2 when the latter is driven in rotation about the additional axis of rotation 74. It will be understood that, when the light module 2 is driven in rotation about the additional axis of rotation 74, the rotation according to the first axis of rotation 4 is possible notably by virtue of a configuration provided for this purpose.

There now follows a description of the operation of the light device, and in particular a first mode in which the light beam at the output of the light module 2 is shifted horizontally, and a second mode in which the light beam at the output of the light module is shifted vertically. These two modes of operation can operate simultaneously or alternately.

The first mode of operation consists in having the actuator 12 transmit to the output shaft 16 a rotational movement, said output shaft 16 driving the optical deflection elements 6 in rotation about the axis of rotation 4, the rotation being guided along a path defined by the configuration of the rotation guiding device 14. The optical deflection elements 6 rotate about the axis of rotation 4 by an angle defined by the control instructions sent to the actuator while the support 10 and the light sources that it bears remain fixed. A bracket support 80 forms the link between the support 10 of the light source and the actuator 12, by being on the one hand secured to the second part 30 of the support and on the other hand secured to a fixing support 82 of the actuator 12, by virtue of fixing means here a screwing stock arranged between the bracket support and the fixing support and passed through by a tightening screw that is not visible which fixes the bracket support to the fixing support. This bracket support remains fixed during the rotation of the optical deflection elements about the axis of rotation 4. This rotation of the optical deflection elements about the axis of rotation 4 generates a shifting of the rays emitted by the light source 8 such that it is possible to generate a transverse movement of the beam at the output of the lighting and/or signaling device. It will be understood that, according to the invention, the rotation of the optical deflection elements is done without being hampered by the bundle of cables which remains, in its first portion and its second portion, taut between the second part and the first part of the support, which are fixed during this rotation of the optical deflection elements.

The second mode of operation consists in having the actuation means, not represented in FIG. 5, capable of pushing on the bracket support 80 in its bottom part, away from the support 10. This pushing on the bracket support 80 results in a pivoting of the module assembly about the additional axis of rotation 74. The protuberances 72 protruding from the second part 30 of the support 10 rotate in the fixed bearings 77 borne by the plate 76. The bottom part of the bracket support pivots driving, in its rotation about the additional axis of rotation 74, the fixing support 82 of the actuator 12, the actuator 12, the output shaft 16, the optical deflection elements 6, the rotation guiding device 14 and the different parts of the support 10. It will be understood that when the bracket support pivots, the second part 30 of the support 10 is also driven in rotation about the additional axis of rotation, which drives, in the same rotation, the rotation guiding device 14 and the first part 28 of the support, then the optical deflection elements and the actuator. All these components are thus taken as a single assembly secured in rotation about the additional axis of rotation 74 to produce a vertical shift of the light beam at the output of the light module 2.

The above description clearly explains how the invention can achieve the objectives set for it and in particular propose a lighting and/or signaling light module, rotationally mobile according to at least one axis of rotation by virtue of the actuator 12, and without constraint by virtue of a rotation guiding device 14. According to the invention, the location of the guiding device 14 at an end of the optical deflection elements opposite the output shaft 16 and the actuator 12 makes it possible for the optical deflection elements 6 to be kept in the top part during the rotation and to best adjust the position of the light source at the focus of the optical deflection elements.

The particular configuration of the rotation guiding device 14, namely a stacking of the different components of this guiding device with different parts of the support 10 bearing the light source, makes it possible to advantageously propose an assembly that is compact and with minimal play between the different parts of the light module 2, thus causing less vibration and premature wear of the different components. The reliability of the rotational movement in the guiding path about the axis of rotation 4 of the light module 2 is then increased.

The invention claimed is:

1. Light module for a motor vehicle comprising
at least one light source capable of emitting light rays,
at least one support bearing said light source,
at least one electrical power supply cable of said at least one light source,
at least one optical deflection element arranged so as to deflect the light rays emitted by the at least one light source to form a projected light beam at the output of the light module,
a guiding device for guiding the optical deflection element in rotation about an axis of rotation, in order to transversely shift the projected light beam, characterized in that the support comprises a first part, bearing the light source, and a second part, between which there is inserted at least a part of the rotation guiding device of the optical deflection element and in that said at least one cable passes through the rotation guiding device to be connected to said light source.

2. Light module according to claim 1, wherein the at least one cable comprises a first portion for connection to a control module, arranged at least partly in the second part of the support, a second intermediate portion, passing through the rotation guiding device, and a third portion for connection to the light source.

3. Light module according to claim 1, wherein the at least one cable passes through the rotation guiding device substantially at the center thereof, so as to be centered on the axis of rotation.

4. Light module according to claim 1, wherein the first part of the support has a first face bearing the light source, an opposite second face turned toward the second part of the support and a peripheral face axially linking the first and the second face.

5. Light module according to claim 2, wherein the third portion of the at least one cable is arranged along the second face and against the peripheral face, such that the at least one cable is at least partially offset in this third portion relative to the axis of rotation of the optical deflection element.

6. Light module according to claim 5, wherein an indentation is arranged at least on the second face to house the third portion of the at least one cable.

7. Light module according to claim 6, wherein a flat is formed axially by machining the peripheral face, said at least one cable being pressed against said flat.

8. Light module according to claim 1, wherein a support plate of the light source has a first face bearing the light source and a second face arranged against the first face of the first part of the support, said at least one cable being connected to a second face of the first support plate.

9. Light module according to claim 1, wherein the light module comprises a guiding sleeve for the at least one cable fixed to the first part of the support.

10. Light module according to claim 9, wherein the rotation guiding device consists of a stator secured to the second part of the support and of a rotor secured to the optical deflection element and configured to rotate about the stator.

11. Light module according to claim 10, wherein at least the stator is pierced axially to allow the passage of the at least one electrical power supply cable of the light source.

12. Light module according to claim 11, wherein the stator is gripped between the two parts of the support.

13. Light device, notably for lighting and/or signaling, comprising at least one light module according to claim 1.

14. Light device according to claim 13, wherein the light module comprises a casing defining, with an enclosing outer lens, a housing for receiving at least one light module.

15. Light module according to claim 2, wherein the at least one cable passes through the rotation guiding device substantially at the center thereof, so as to be centered on the axis of rotation.

16. Light module according to claim 2, wherein the first part of the support has a first face bearing the light source, an opposite second face turned toward the second part of the support and a peripheral face axially linking the first and the second face.

17. Light module according to claim 4, wherein the third portion of the at least one cable is arranged along the second face and against the peripheral face, such that the at least one cable is at least partially offset in this third portion relative to the axis of rotation of the optical deflection element.

18. Light module according to claim 4, wherein a flat is formed axially by machining the peripheral face, said at least one cable, being pressed against said flat.

19. Light module according to claim 7 wherein a support plate of the light source has a first face bearing the light source and a second face arranged against the first face of the first part of the support, said at least one cable being connected to a second face of the first support plate.

20. Light module according to claim 8, wherein the light module comprises a guiding sleeve for the at least one cable fixed to the first part of the support.

\* \* \* \* \*